(12) United States Patent
Williams

(10) Patent No.: US 6,854,524 B1
(45) Date of Patent: Feb. 15, 2005

(54) TOOLS AND METHODS TO TRIM EXCESS VEGETATION FROM GROWING PLANTS

(76) Inventor: Rudolph C. Williams, 3231 Catherine St., Moss Point, MS (US) 39563

(*) Notice: Subject to any disclaimer, the term of this patent is extended or adjusted under 35 U.S.C. 154(b) by 0 days.

(21) Appl. No.: 10/369,620

(22) Filed: Feb. 21, 2003

(51) Int. Cl.$^7$ .............................. A01B 1/16; A01B 1/24
(52) U.S. Cl. ..................... 172/13; 172/373; 172/378; 171/5
(58) Field of Search .............. 171/5; 172/13–18, 172/25, 378, 373, 374

(56) References Cited

U.S. PATENT DOCUMENTS

| | | | | |
|---|---|---|---|---|
| 3,111,995 A | * | 11/1963 | Dahl ........................... | 172/18 |
| 3,143,176 A | * | 8/1964 | Drane, Jr. .................... | 172/13 |
| 3,198,719 A | * | 8/1965 | Stewart ...................... | 294/50.5 |
| 3,554,293 A | * | 1/1971 | Aman et al. ................. | 172/13 |
| 3,814,189 A | * | 6/1974 | Thompson ................... | 172/13 |
| 3,905,103 A | * | 9/1975 | Ford et al. ................... | 30/276 |
| 3,923,102 A | * | 12/1975 | Morris ........................ | 172/13 |
| 3,938,249 A | * | 2/1976 | Chacon ....................... | 30/300 |
| 3,960,218 A | | 6/1976 | Atchley et al. | |
| 4,051,596 A | | 10/1977 | Hofmann | |
| 4,832,131 A | * | 5/1989 | Powell et al. ................ | 172/25 |
| 5,228,521 A | | 7/1993 | Sing | |
| 5,338,078 A | * | 8/1994 | Basek ........................ | 294/50.5 |
| 5,461,788 A | * | 10/1995 | Taylor ........................ | 30/300 |
| 5,525,129 A | | 6/1996 | Weder et al. | |
| 5,862,658 A | | 1/1999 | Howard | |
| 5,938,290 A | * | 8/1999 | Mikeska ...................... | 172/25 |
| 6,189,627 B1 | | 2/2001 | Marshall et al. | |
| 6,227,317 B1 | | 5/2001 | Severns | |
| 6,311,782 B1 | | 11/2001 | Plasek et al. | |
| 6,340,061 B2 | | 1/2002 | Marshall et al. | |

* cited by examiner

*Primary Examiner*—Robert E. Pezzuto
*Assistant Examiner*—Alexandra K. Pechhold
(74) *Attorney, Agent, or Firm*—Nixon & Vanderhye PC

(57) ABSTRACT

Tools for trimming excess vegetation from growing plants include inner and outer coaxially positioned, relatively rotatable cutter blade assemblies which establish an interior volume for receiving a plant to be trimmed. Excess vegetation from the plant which extends outwardly of the interior volume established by the cutter blades will therefore be severed upon relative rotation being effected therebetween. Most preferably, the inner cutter assembly includes sets of elongate cutter blade members whose having tined ends which may be partially embedded in the soil surrounding the growing plant to be trimmed. The outer cutter assembly is mounted for free movement both rotationally and longitudinally regarding the inner cutter assembly, and is most preferably connected to a motorized source of power (e.g., a conventional hand-held electric drill). The tined ends may therefore be embedded in the soil surrounding the plant so that the plant occupies the interior volume defined thereby and so that the inner cutter assembly remains stationary during the trimming procedure. The outer cutter assembly may then be sleeved over the inner cutter assembly, and rotated (e.g., by operation of the electric drill attached thereto) to thereby cause the excess vegetation extending outwardly from the interior volume to be severed.

18 Claims, 6 Drawing Sheets

TOOLS AND METHODS TO TRIM EXCESS VEGETATION FROM GROWING PLANTS

FIELD OF THE INVENTION

The present invention relates generally to tools and methods adapted to trim excess vegetation from growing plants.

BACKGROUND AND SUMMARY OF THE INVENTION

Tools which trim excess vegetation from growing plants, such as so-called string trimmers, hedge trimmers and the like are in and of themselves well known. There is, however, no known tool or method capable of symmetrically trimming excess vegetation from a growing plant in an efficient and expedient manner. It is towards providing such a tools and methods that the present invention is directed.

Broadly, the present invention is embodied tools for trimming excess vegetation from growing plants (hereinafter sometimes referred to more colloquially as a "plant trimmer") which comprises inner and outer coaxially positioned, relatively rotatable cutter blade assemblies which establish an interior volume for receiving a plant to be trimmed. Excess vegetation-from the plant which extends outwardly of the interior volume established by the cutter blades will therefore be severed upon relative rotation being effected therebetween.

Most preferably, the inner blade cutter assembly includes sets of elongate inner cutter blade members whose respective tined ends may be partially embedded in the soil surrounding the growing plant to be trimmed. The outer cutter blade assembly is mounted for free movement both rotationally and longitudinally relative to the inner cutter blade assembly, and is most preferably connected to a motorized source of power (e.g., a conventional hand-held electric drill). The tined ends of the inner cutter blade members may therefore be embedded in the soil surrounding the plant so that the plant occupies the interior volume defined thereby and so that the inner cutter blade assembly remains stationary during the trimming procedure. The outer cutter blade assembly may then be sleeved in close tolerance over the inner cutter assembly, and rotated (e.g., by operation of the electric drill attached thereto) to thereby cause the excess vegetation extending outwardly from the interior volume to be severed.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE INVENTION

Figure 1:
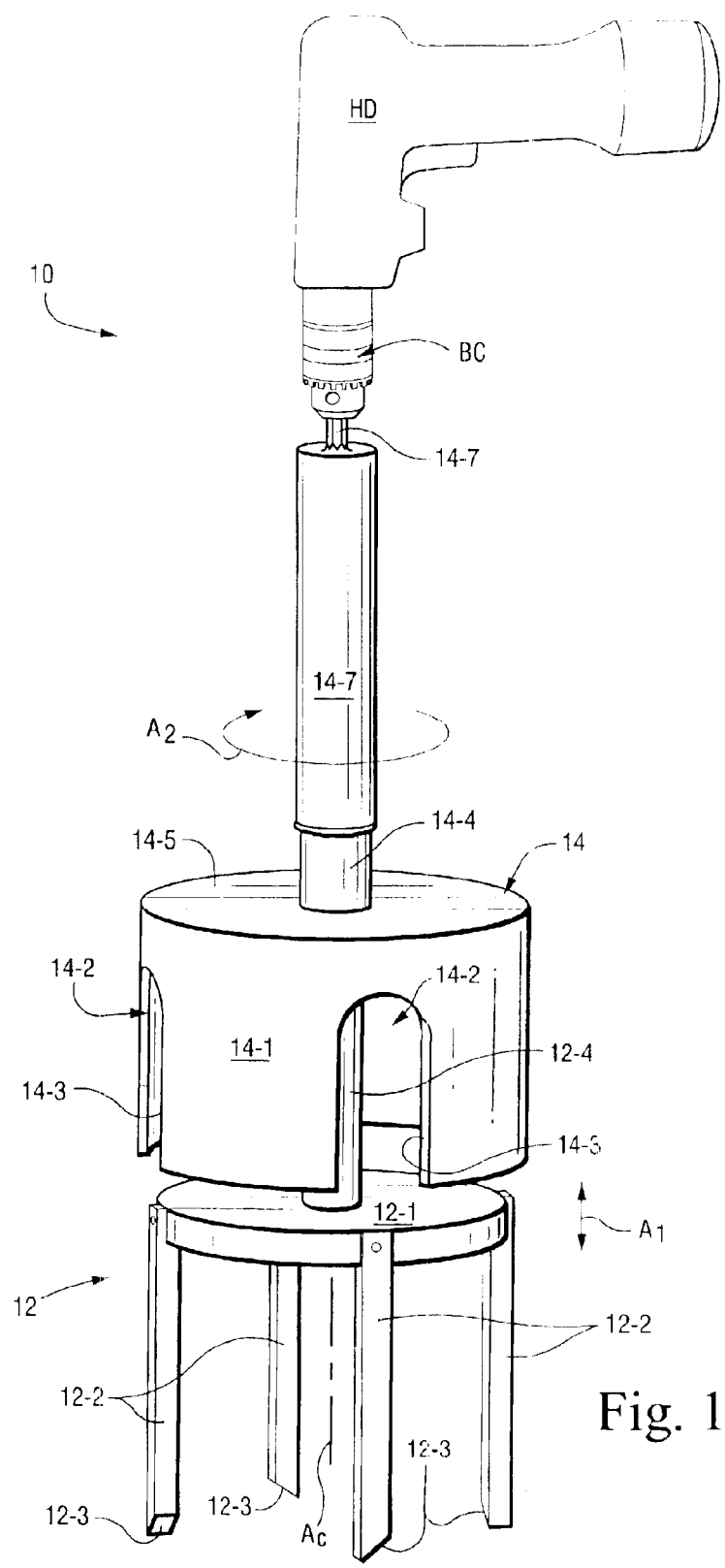
FIG. 1 is a perspective view of an exemplary plant trimmer system in accordance with the present invention.
Figure 2:
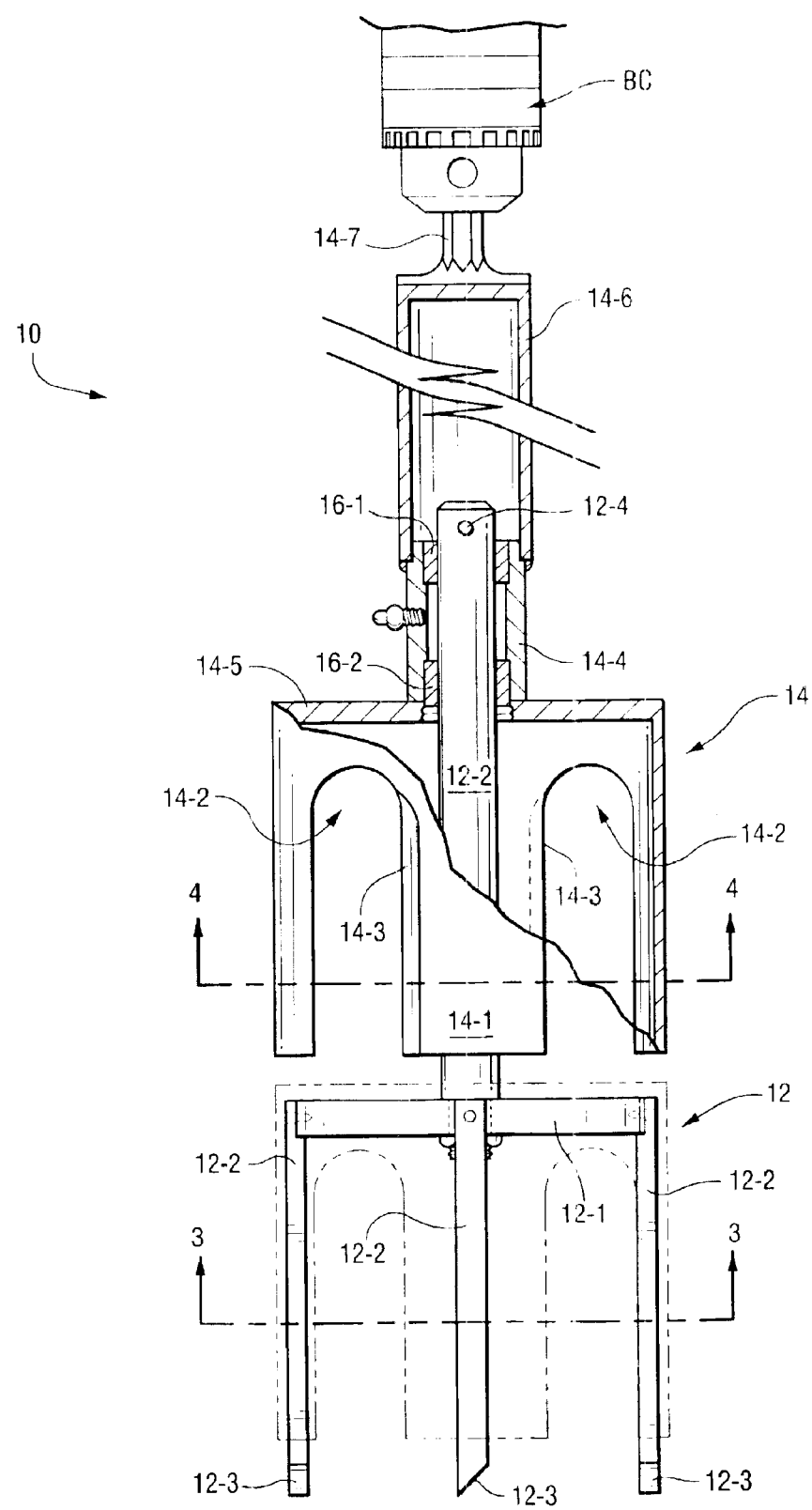
FIG. 2 is an elevational view, partly in section, of the exemplary plant trimmer system depicted in FIG. 1.
Figure 3:
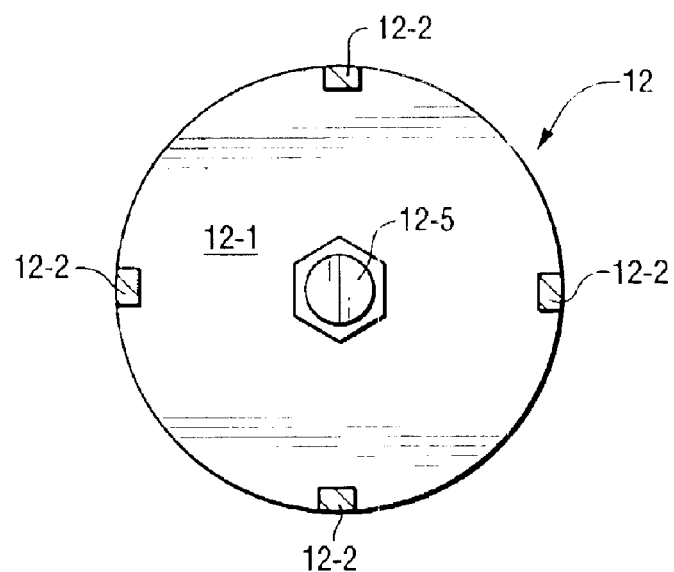
FIG. 3 is a cross-sectional view of the inner blade assembly employed in the plant trimmer of this invention as taken along line 3—3 in FIG. 2.

An exemplary embodiment of a plant trimmer system 10 in accordance with the present invention is depicted in accompanying FIGS. 1 and 2 as comprising inner and outer cutter blade assemblies 12, 14, respectively. The inner cutter blade assembly 12 is composed of a mounting plate 12-1, and multiple elongate inner cutter blades 12-2 rigidly attached to, and dependently extending from, the plate 12-1. The inner cutter blades 12-2 most preferably terminate in tines 12-3 to allow the blades to be embedded partially in the soil surrounding the growing plant to be trimmed. An inner mounting shaft 12-4 extends coaxially upwardly from the mounting plate 12-1 along the central axis $A_c$ of the system 10 and is rigidly connected to the mounting plate 12-1 by bolt and nut assembly 12-5 (see FIG. 3).

Figure 4:
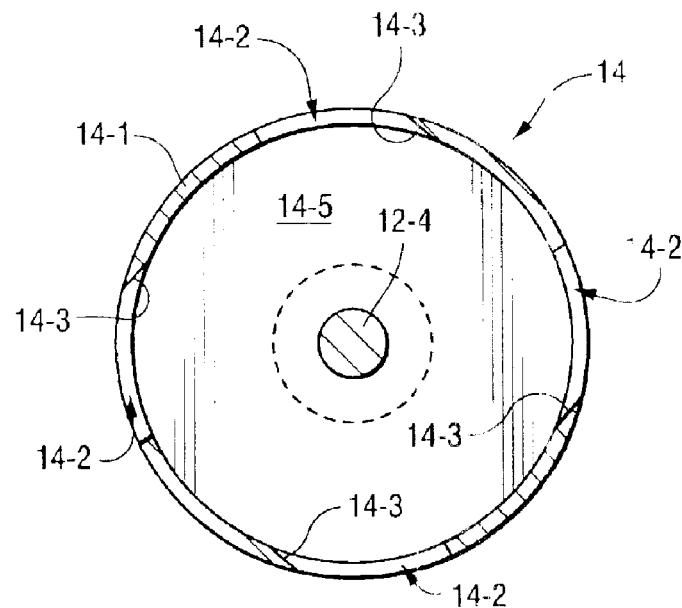
FIG. 4 is a cross-sectional view of the outer blade assembly employed in the plant trimmer of this invention as taken along line 4—4 in FIG. 2.

The outer cutter blade assembly 14 includes an outer generally cylindrically shaped body member 14-1 defining multiple elongate channels 14-2 oriented generally parallel to the central axis $A_c$. An edge 14-3 of the channels 14-2 is sharpened so as to provide a respective outer cutter blade (see FIG. 4). A hollow stub shaft 14-4 is rigidly connected to the upper wall 14-5 of assembly 14 and is coaxially sleeved over the inner mounting shaft 12-4. The stub shaft 14-4 is in turn rigidly coupled (e.g., via welding) to outer drive shaft 14-6.

As is perhaps more clearly shown in FIG. 2, the stub shaft 14-4 and inner shaft 12-4 are coupled to one another via upper and lower bearing rings 16-1, 16-2. A grease fitting 18 is provided so as to allow lubrication to be introduced to the bearing rings 16-1, 16-2. The uppermost end of the inner mounting shaft 12-2 is provided with a transverse pin 12-4 to prevent the shaft 12-2, and hence the inner cutter assembly 12, from separating under its own weight from the outer drive shaft 14-6.

The mounting of the inner shaft 12-2 and the stub shaft 14-4 therefore allows for independent rotational and longitudinal motion (arrows $A_1$, and $A_2$, respectively in FIG. 1) to occur between the inner shaft 12-4 on the one hand, and the stub shaft 14-4 and outer shaft 14-6, on the other hand, relative to one another and to the central axis $A_c$. It will further be observed in this regard that the length of the outer drive shaft 14-6 is sufficient to accommodate the length of the inner mounting shaft 12-4. Thus, when the outer cutter blade assembly 14 is moved reciprocally along the central axis $A_c$ between an inoperative cutting position (e.g., as shown in solid line in FIG. 2) to an operative cutting position (e.g., as shown in phantom line in FIG. 2) relative to the inner cutter blade assembly 12, the inner shaft 12-4 is accommodated along its length within the outer draft shaft 14-6.

Most preferably, motive power is provided to the outer drive shaft 14-6 via a conventional hand-held electric drill HD. For such purpose, a drive attachment 14-7 is fixed to and coaxially extends upwardly from the proximal end of the outer drive shaft 14-6. The drive attachment 14-7 is in turn received within and held by the bit chuck BC of the drill HD. Operating the hand drill will therefore responsively cause the outer drive shaft 14-6, and hence the outer cutter blade assembly 14 to rotate about the central axis $A_c$.

Figure 5:
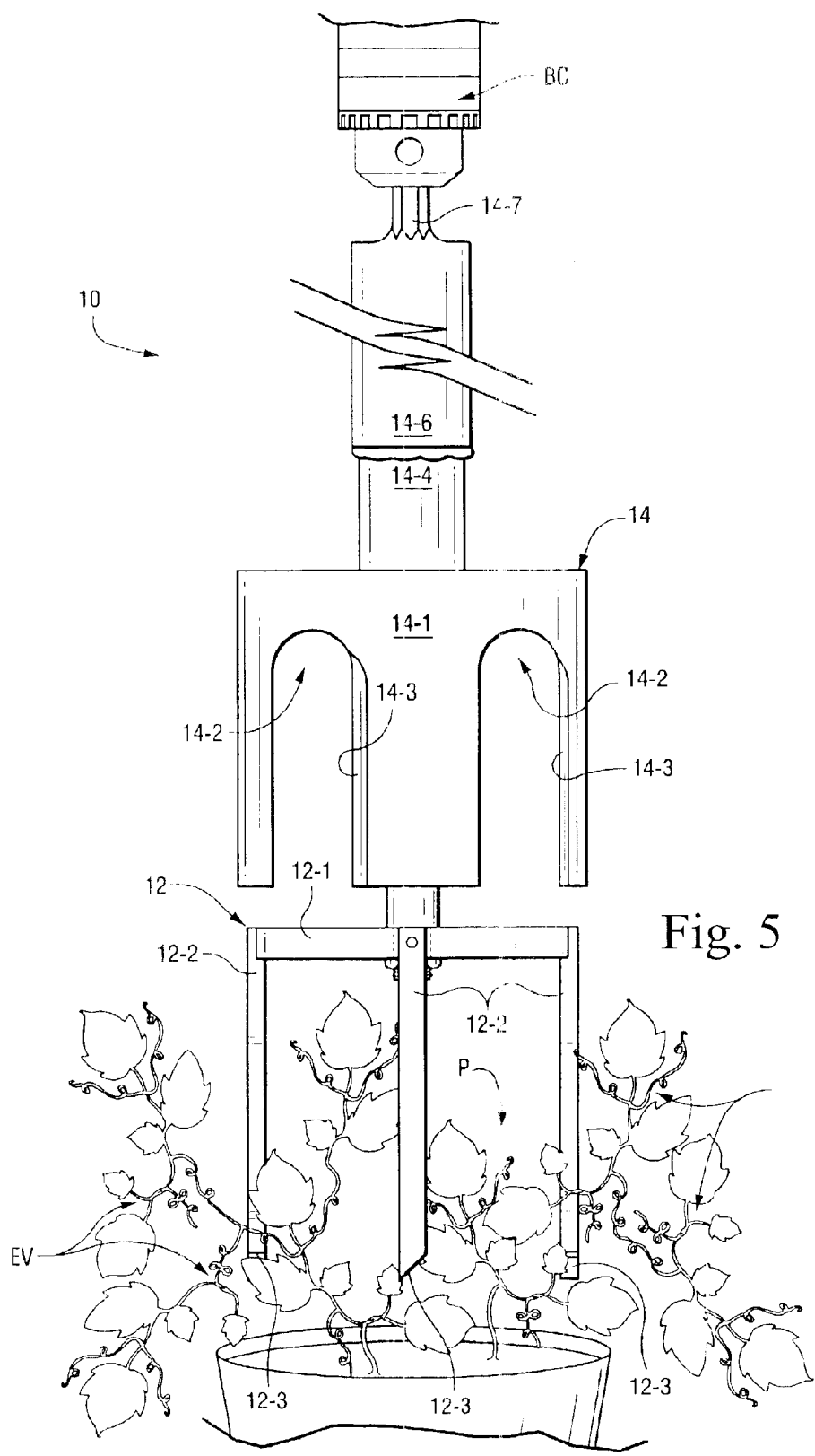
FIGS. 5–7 depict an operational sequence using the plant trimmer system of FIG. 1 to trim excess vegetation from a potted plant.
Figure 6:
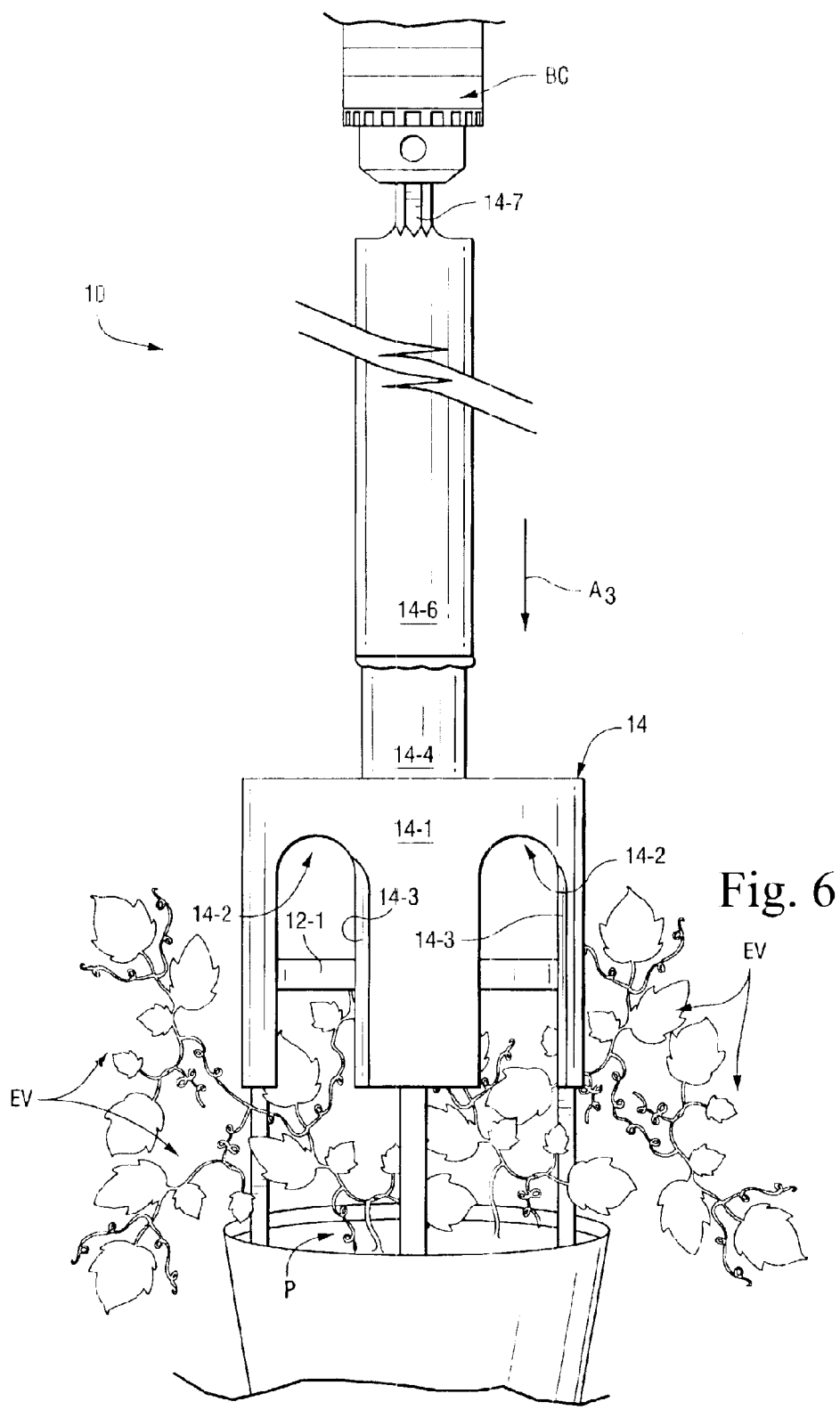
Figure 7:
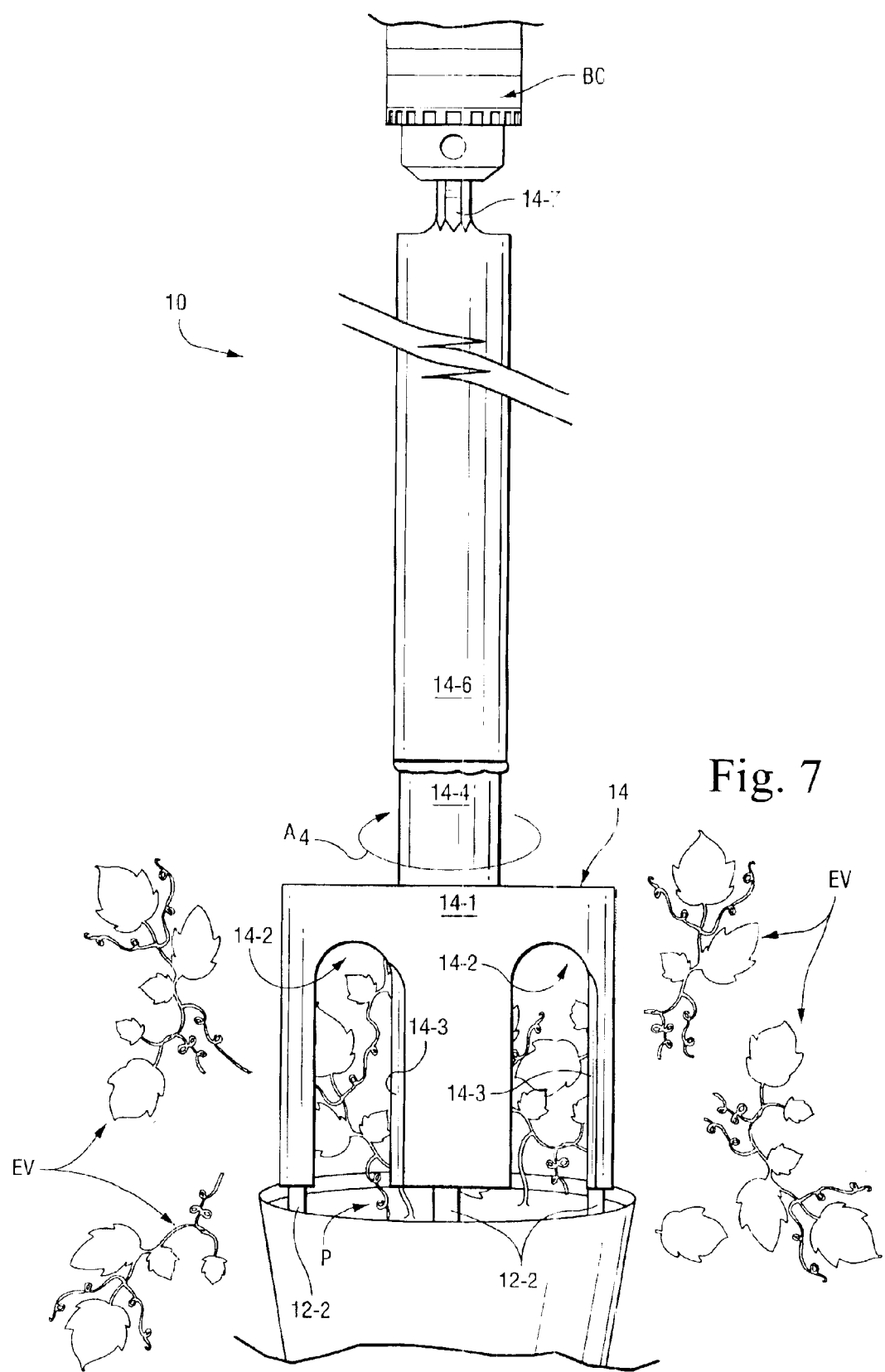

An exemplary operational sequence employing the plant trimmer system 10 in accordance with the present invention is depicted in accompanying FIGS. 5–7. In this regard, as shown in FIG. 5, the system 10 is initially positioned over a plant P having excess vegetation EV to be trimmed therefrom. The system 10 is then lowered toward the plant P which causes the tines 12-3 of the cutter blades 12-2 to contact the soil surrounding the plant P. The weight of the system 10 causes the tines to become at least partially embedded within the soil surrounding the plant and allows a portion of the plant P to occupy the internal volume defined by the inner cutter blade assembly 12 with the excess vegetation to be trimmed extending outwardly from such internal volume.

As depicted in FIG. 6, continued downward movement of the system 10 (arrow $A_3$) causes the outer cutter blade assembly 14 to be sleeved over the inner cutter blade assembly 12 in close tolerance thereto. Upon operation of the hand held drill HD, the outer cutter assembly 14 will be caused rapidly to rotate (arrow $A_4$ in FIG. 7) relative to the stationary inner cutter blade assembly 12 therein causing the excess vegetation EV extending outwardly of the internal volume defined by the cutter assemblies 12, 14 to be severed due to the scissoring action of the inner and outer cutter blades 12-2 and 14-3, respectively. Once the trimming operation has been completed, the entire system 10 may be lifted physically and transported to the next plant in need of trimming.

It should be understood that, although the inner and outer cutter blade assemblies 12, 14, respectively are depicted as defining a generally cylindrical interior volume other geometries may be provided. Thus, it is entirely possible that the inner and outer blade assemblies 12, 14 could be configured so as to interior volumes which, in cross-section, have a curved concave and/or convex shape. Thus, ellipsoids and other non-cylindrical geometries may be provided as may be desired.

In addition, it is preferred that a motorized drive (e.g., a hand-held electric drill HD) be employed as the motive means to rotationally drive the outer cutter blade assembly 14 relative to the inner cutter blade assembly 12. Other means may be employed, however, including a manually operated hand crank, peddle system or the like. Moreover, larger size plant trimmer systems in accordance with the present invention my require larger motors for purpose of operation, in which case the entire system may itself be provided with structural support so that the plants may be brought to the system for trimming.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A plant trimmer for trimming excess vegetation of an above-ground growing plant and for shaping vegetation which remains into a desired geometric configuration, said plant trimmer comprising:

inner and outer coaxially sleeved cutter blade assemblies which are mounted for relative rotational and longitudinal movement relative to one another, said inner and outer cutter blade assemblies circumscribing an interior volume corresponding to the desired geometric configuration to shape vegetation with remains after trimming the excess vegetation of the above-ground growing plant, said inner and outer cutter blade assemblies receiving the above-ground growing plant to be trimmed such that the excess vegetation thereof extends outwardly of said interior volume, wherein said inner and outer cutter blade assemblies include circumferentially spaced-apart sets of elongate inner and outer cutter blades, respectively, and wherein one of said sets of inner and outer cutter blades is adapted to being partially embedded into the soil surrounding said above-ground growing plant so as to be in a fixed position while the other of said inner and outer cutter blades is adapted to remain above ground and thereby be freely rotatable with respect thereto; and wherein said inner and outer cutter blades cooperate in a scissors manner so as to sever the excess vegetation extending outwardly from said internal volume in response to said relative rotation between said fixed-position of said inner and outer cutter blades and said freely rotatable other of said inner and outer cutter blades.

2. The plant trimmer of claim 1, wherein said inner and outer cutter blade assemblies comprise multiple opposed pairs of inner and outer cutter blades.

3. The plant trimmer of claim 2, wherein said multiple pairs of inner and outer cutter blades are elongate and extend substantially parallel to, but are radially spaced from, a central rotational axis of said inner and outer cutter blade assemblies.

4. A plant trimmer comprising inner and outer coaxially sleeved cutter blade assemblies which are mounted for relative rotational movement thereby circumscribing a generally cylindrical interior volume for receiving an above-ground growing plant to be trimmed such that excess vegetation extends outwardly from said circumscribed interior volume, wherein (i) said inner cutter blade assembly comprises a plurality of circumferentially spaced-apart elongate longitudinal inner cutter blades defining said generally interior cylindrical volume, said inner cutter blades having a distal end capable of being embedded partially within soil surrounding the growing plant to thereby positionally fix said inner cutter blades relative to the growing plant; and wherein (ii) said outer blade assembly comprise a generally cylindrical outer body member conformably shaped with respect to said generally interior cylindrical volume defined by said inner cutter blades, said outer body having at least one elongate longitudinally extending U-shaped channel therein, said channel having a sharpened longitudinal edge which establishes at least one outer cutter blade; and wherein (iii) said outer blade assembly further comprises a drive shaft establishing a central rotational axis which is rigidly mounted to, and extending outwardly from, said outer body member whereby said outer blade assembly may be rotated freely above-ground relative to said positionally fixed inner cutter blades so as to sever excess vegetation extending outwardly from said interior volume by means of a scissors action between said at least one longitudinal sharpened edge of said outer blade assembly and said longitudinal inner cutter elements of said inner blade assembly.

5. The plant trimmer of claim 4, wherein said outer body member defines multiple pairs of opposed elongate U-shaped channels therein, each of said channels having a sharpened longitudinal edge which establishes a respective outer cutter blade.

6. The plant trimmer of claim 4 or 5, wherein each of said elongate inner cutter blades has a tine member at a the distal end thereof.

7. The plant trimmer of claim 6, wherein said plurality of elongate inner cutter blades are disposed relative to one another in opposed circumferentially spaced-apart pairs thereof.

8. A plant trimmer for trimming excess vegetation from an above-ground growing plant and for shaping vegetation which remains after the excess vegetation has been trimmed therefrom, said plant trimmer comprising:

an inner cutter blade assembly having a plurality of inner cutter blades circumferentially spaced-apart around a central axis thereof, each of said inner cutter blades terminating in a distal end which is adapted to being partially embedded within soil surrounding the above-ground growing plant so as to positionally fix the inner cutter blades relative thereto;

an outer cutter blade assembly having a plurality of generally U-shaped channels therein circumferentially spaced-apart around said central axis, said channels having longitudinally extending sharpened edges which establish respective outer cutter blades; and means for mounting said inner cutter blade assembly and said outer cutter blade assembly one to another to allow said outer cutter blade assembly to be moveable longitudinally and rotationally relative to said inner cutter blade assembly and said central axis thereof, wherein (1) said outer cutter assembly is movable longitudinally along said central axis between an inoperative position wherein said outer cutter blade assembly is spaced longitudinally from said inner cutter blade assembly when positionally fixed in the soil surrounding the above-ground growing plant, and an operative position wherein said positionally fixed inner cutter blade assembly is nested within said outer cutter blade assembly; and wherein (2) said outer cutter assembly is movable rotationally about said central axis above the soil surrounding the above-ground growing plant such that the excess vegetation of the plant which extends outwardly from said inner and outer cutter blade assemblies is responsively severed by a scissors action between said sharpened longitudinal edges of said outer cutter assembly and said positionally fixed inner cutter blades when said outer cutter assembly is in said operative position thereof.

9. The plant trimmer of claim 8, wherein said inner cutter blade assembly includes comprise multiple opposed pairs of said inner cutter blades.

10. The plant trimmer of claim 9, wherein said inner cutter blades comprise tines.

11. The plant trimmer of claim 10, wherein said means for mounting comprises:

(i) a mounting shaft fixed to and extending coaxially from said inner cutter blade assembly along said central axis;

(ii) a drive shaft fixed to said outer cutter blade assembly and coaxially sleeved over said mounting shaft; and (iii) a bearing assembly which mounts couples said mounting and drive shafts to one another to allow for independent rotational and longitudinal movements relative to one another and to said central axis.

12. The plant trimmer of claim 11, wherein said drive shaft includes a drive attachment for coupling said drive shaft to a motorized drive.

13. A method of trimming excess vegetation from an above-ground growing plant comprising the steps of:

(a) providing a plant trimmer having inner and outer cutter blade assemblies which collectively define an interior volume of desired geometric configuration, wherein said inner cutter assembly includes elongate inner cutter blades which terminate in distal ends, and wherein said outer cutter blade assembly includes sharpened longitudinal edges providing outer cutter blades which cooperate with the inner cutter blades to sever plant vegetation in a scissors action upon relative rotation therebetween;

(b) positioning the plant within the interior volume defined by the inner and outer cutter blade assemblies by partially embedding the distal ends of the inner cutter blades within the soil surrounding the plant while ensuring that the outer cutter blade assembly is freely rotatable relative to the inner cutter blade assembly above the soil surrounding the plant such that excess vegetation to be trimmed therefrom extends outwardly from said interior volume through the inner and outer cutter blades, and thereafter (c) effecting rotation of the outer cutter assembly relative to the fixed-position inner cutter blade assembly to thereby sever the excess vegetation from the plant.

14. The method of claim 13, step (b) comprises (b1) positioning the outer cutter assembly in coaxial sleeved relationship to the inner cutter assembly.

15. The method of claim 14 wherein step (b1) comprises longitudinally moving the outer cutter assembly into said sleeved relationship with the inner cutter assembly.

16. The method of claim 13, wherein said inner cutter assembly includes a plurality of opposed elongate tine members spaced apart about said interior volume, wherein step (b) comprises positioning a terminal end of each tine member in the soil.

17. The method of claim 13, wherein step (c) comprises the steps of (c1) attaching a hand-held motor to the outer cutter assembly and (c2) thereafter operating the motor so as to effect rotation of the outer cutter assembly relative to the inner cutter assembly.

18. The method of claim 17, wherein step (c1) comprises attaching a hand-held electric drill to serve as said motor.

\* \* \* \* \*